United States Patent [19]

Evans

[11] Patent Number: 4,897,459

[45] Date of Patent: Jan. 30, 1990

[54] CATALYST FOR PRODUCING FLUOROSILICONE POLYMERS

[75] Inventor: Edwin R. Evans, Clifton Park, N.Y.

[73] Assignee: General Electric Company, Waterford, N.Y.

[21] Appl. No.: 125,304

[22] Filed: Nov. 25, 1987

[51] Int. Cl.$^4$ .............................................. C08G 77/06
[52] U.S. Cl. ........................................ 528/18; 528/14; 528/33; 528/34; 528/37; 528/42; 556/454; 556/457; 556/459; 556/463
[58] Field of Search ............... 556/454, 457, 459, 463; 528/37, 42, 18, 33, 34, 14

[56] References Cited

U.S. PATENT DOCUMENTS

| | | | |
|---|---|---|---|
| 4,122,247 | 10/1978 | Evans | 528/14 |
| 4,125,551 | 11/1978 | Petersen | 260/448.2 |
| 4,157,337 | 6/1979 | Evans | 260/448.2 |
| 4,177,200 | 12/1979 | Razzano et al. | 260/448.2 |
| 4,250,290 | 2/1981 | Petersen | 260/448.2 |
| 4,317,899 | 3/1982 | Bluestein et al. | 528/14 |
| 4,348,531 | 9/1982 | Evans | 556/453 |

OTHER PUBLICATIONS

Macromolecular Chemistry.
CA Selects: Organosilicon Chemistry, Issue 13, 1987, p. 13, col. 2, 106:214585a Siloxanes by living polymerization, Nakano, Takaharu; Otake, Nobumasa (Chisso Corp.) etc.

Primary Examiner—Melvyn I. Marquis
Attorney, Agent, or Firm—John W. Harbour

[57] ABSTRACT

Sodium fluorosilanolate catalyst is disclosed which has improved effectiveness as a catalyst to produce fluorosilicone polymer and which at the same time improves fluorosilicone polymer purity.

9 Claims, No Drawings

CATALYST FOR PRODUCING FLUOROSILICONE POLYMERS

The present invention relates to a catalyst for the production of fluorosilicone polymers. More particularly, the present invention relates to a certain sodium fluorosilanolate catalyst for the production of high molecular weight fluorosilicone polymers and polymeric fluids.

BACKGROUND OF THE INVENTION

Fluorosilicone polymers are well known in the industry due to excellent physical properties. However, expense of manufacture and raw materials restricts the use of these polymers to tightly specified applications where, for example, solvent resistance is essential.

Fluorosilicone polymers are produced by first taking the appropriate fluoro-substituted diorganodichlorosilanes and hydrolyzing them. The hydrolyzate is then taken, its acidity reduced to the appropriate level, and it is separated from excess water. Then there is added to the purified hydrolyzate the appropriate amount of alkali metal hydroxide catalyst and the hydrolyzate is heated at temperatures of about 200° C. or more so as to preferentially distil overhead fluoro-substituted cyclo trisiloxanes. In fluorosilicone chemistry it has been found that cyclotrisiloxanes react more readily in forming polymers than do the corresponding cyclotetrasiloxanes. Also, it is known in this chemistry that sodium based catalysts are preferable over potassium due to the necessary and appropriate basicity to optimize yield. Accordingly, there is taken the appropriately formed cyclotrisiloxane and there is added to them a basic sodium polymerization catalyst with the appropriate amount of end-stopping agent and/or molecular weight modifier and the resulting mixture is heated at elevated temperatures so as to form the desired diorganopolysiloxane polymer. Heating may continue for a time period of from ½ to 24 hours, equilibrating the polymer to the desired molecular weight.

It is desirable in fluorosilicone chemistry to increase the effectiveness of the sodium polymerization catalyst in order to reduce the sodium salt residue as a by-product and to reduce time required to equilibrate the polymer to the desired molecular weight. Further, due to disparity in the reactivity of many end-capping agents and cyclotrisiloxane, it is desirable to provide for greater initial end-capping action. Finally, it is desirable to provide a sodium catalyst which does not introduce hydroxy groups or other often undesirable groups into the production of fluorosilicone polymer.

SUMMARY OF THE INVENTION

Briefly, there is provided according to the present invention a sodium fluorosilanolate catalyst for producing fluorosilicone polymers of the formula

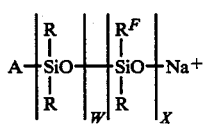

(1)

wherein W is 0 to 50, X is from 3 to 50, A is —OH, a $C_{1-8}$ alpha-beta alkenyl, $C_{1-8}$ alkyl, $C_{1-8}$ aryl, $C_{1-8}$ halosubstituted alkyl, $C_{1-8}$ alkoxy, or —O$^-$Na$^+$, R is a substituted or unsubstituted $C_{1-8}$ hydrocarbon radical, and $R^F$ is a $C_{1-8}$ fluorine substituted alkyl. Such catalyst may be employed to produce, for example, silanol stopped fluorosilicone polymer or alkenyl stopped fluorosilicone polymer. The latter is preferably produced with the above catalyst where A is alkenyl.

DETAILED DESCRIPTION OF THE INVENTION

Suitable substituted or unsubstituted $C_{1-8}$ hydrocarbon radicals of R are preferably, alkyl radicals, such as methyl ethyl, propyl, etc.; aryl radicals, such as phenyl, etc.; cycloalkyl radicals, such as cyclohexyl, cycloheptyl, etc.; alkenyl radicals, such as vinyl, allyl, etc.; and fluoroalkyl radicals, such as 3,3,3-trifluoropropyl, etc. Preferably R is methyl. Suitable $C_{1-8}$ fluorine substituted alkyl of $R^F$ is most preferably a fluoroalkyl radical such as 3,3,3-trifluoropropyl.

It is not the molecular weight of the sodium silanolate that is critical herein but the $R^F$ substitution and A. Thus W and X are not critical. However, neither W nor X should be so high that the catalyst by necessity has too low a content of Na$^+$ to be useful. Thus W is set from 0 to 50 and X is from about 3 to 50. Obviously the least desirable catalyst is one in which W is much greater than X and the more desirble catalysts are those where X is greater than W. Preferably, W is 1 to 10 and X is 3 to 15.

The radical A herein is —OH, a $C_{1-8}$ alkenyl such as vinyl; a $C_{1-8}$ alkyl such as methyl; a $C_{1-8}$ aryl such as phenyl; a $C_{1-8}$ halosubstituted alkyl such as 3,3,3-trifluorophenyl; propyl; a $C_{1-8}$ alkoxy such as octyloxy; and —O$^-$Na$^+$. Particular advantages may be obtained where A is $C_{1-8}$ alkenyl or more specifically vinyl. Where A is vinyl, such functional end-capping of the polymer is immediate upon polymerization. Thus, vinyl functionality may be increased simultaneously to retarding the extremely fast polymerization of the cyclotrisiloxane. Further, a catalyst in which A is vinyl can be utilized to produce an entirely vinyl fluorosilicone polymer without hydroxy contamination.

The sodium silanolate catalyst may be prepared by (1) heating to a temperature of from 40° C. to 150° C. a mixture of (i) cyclictrifluorosiloxane fluid, (ii) an effective amount of —A group source to control molecular weight, and (iii) NaOH in an amount from 0.5 to 10% by weight of the fluorosilicone fluid, for a period of from ½ to 4 hours, and (2) removing by-products.

Suitable cyclictrifluorosilicone is given by the empirical formula $(R_eR_f^F)_p$ where R and $R^F$ are given above, e+f=2, f is from 0.05 to 1 and p varies from 3 to 3.5. Preferably p is 3 to 3.25 and ideally it is 3.0. The fluorosilicone content of the cyclictrifluorosiloxane is meant to control the desired solubility in the fluorosilicone polymer to be polymerized. If the polymer to be polymerized is 100% fluorosilicone polymer, i.e. has an equivalent f=1, then maximum fluorosilicone character in the catalyst will be beneficial. Persons skilled in the art can adjust f to maximize catalyst effectiveness.

The —A group source serves a function identical to the chainstopper described below for polymerization of the polymer. An effective amount of —A group source should be employed to chainstop the sodium silanolate catalyst and control molecular weight as desired. Like a chainstopper, the —A group source should be employed to chainstop the sodium silanolate catalyst and control molecular weight as desired. Unlike a chainstopper, the —A group source must not act to deactivate the catalyst. Thus chlorosilanes may not be employed. Also, the molecular weight of the catalyst is much lower than the molecular weight of the polymer. In consequence, the concentration of —A group is much higher than of chainstopper in the finished fluorosilicone polymer. Thus using silanol fluid alone to control molecular weight may not be as effective as in the case of polymerizing the fluorosilicone polymer. With the removal of water, silanol content can be reduced to levels where molecular weight would be excessive without a second —A group source.

The —A group source may be selected from certain known chainstoppers as described below and include amine silanes such as $R_2Si(A)(NR_2)$ and siloxanes such as $A(R_2SiO)_qA$ where q is 2 to 15. A preferred siloxane has the formula:

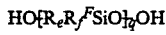
HO[R$_e$R$_f^F$SiO]$_q$OH where R, $R^F$, e, f, and q are given above. In this siloxane, —A is —OH and as discussed above, is preferably used with a second —A group source. However, reactivity of this preferred siloxane prevents an immediate molecular weight build of the very reactive cyclictrifluorosiloxanes.

Where —A is vinyl permits the manufacture of vinyl chainstopped fluorosilicone polymer of exceptional purity. With the use of such a catalyst, not only can —OH groups be eliminated almost entirely from the polymerization, but vinyl chainstops are immediately inserted upon the beginning of catalysis. A preferred —A group with —A as vinyl is:

1,3-divinyl-1,1,3,3-tetramethyldisiloxane.

Thus the —A group source can be any of the above mentioned compounds to control molecular weight of the catalyst during manufacture and to control properties in the finished fluorosilicone polymer. Preferably there is used a combination of silanol chainstopped siloxane with a second —A group which will not condense. An effective amount of silanol siloxane —A group source varies from about 1% to about 50% by weight based on cyclotrifluorosiloxane. Other —A group source must be employed in more nearly stoichiometric amounts. An —A group source, for example having the formula $Vi(R_2SiO)_qVi$ where R and q are given, should be used in amounts ranging from 0.5 to 25% by weight based on cyclotrifluorosiloxane.

The sodium hydroxide is generally used in solution and added over a period of time to prevent a violent reaction. The solution may vary from 10 to 70% NaOH and is preferably as concentrated as practical to minimize separation of the water for purification. Calculated as NaOH to fluorosilicone fluid, the NaOH should be present in the silanolate forming reaction in a preferred amount of from 2 to 5%. In addition to the NaOH, there may be prior added a sodium silanolate seed catalyst to ring open and polymerize some portion of the cyclic fluorosilicone fluid and reduce the exothermic nature of reaction.

The heating should be carried out for a time necessary to form the catalyst, i.e. from about ½ to 4 hours at a preferred temperature of 100° to 150° C. To avoid a violent reaction, NaOH addition should be performed at lower temperatures. During the time mentioned above the reaction should be driven to completion by the removal of water and other by-products.

The product is a clear colorless fluid ranging in viscosity from about 500 to 10,000 centipoise and preferably 500 to 3000 centipoise. Where —A is other than —OH, the —OH content can be easily reduced to less than 0.05 % by weight with removal of water.

The marketplace today finds most useful several fluorosilicone polymers which may be produced with the catalyst herein. Silanol or vinyl terminated, vinyl-on-chain fluorosilicone polymer is useful in compounding rubber along with vinyl terminated fluorosilicone. Trimethyl terminated fluorosilicone polymer is used in oils at viscosities of, for instance, 1000 centipoise at 25° C. The catalyst herein may be used to produce any of these by known processes and is particularly suited to producing vinyl terminated polymers.

Production of fluorosilicone polymer may be accomplished herein by (1) heating to a temperature of between 40° C. and 150° C. a mixture of (i) a cyclosiloxane fluid of the empirical formula 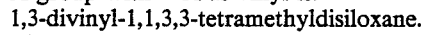 $(R_aR_b^FSiO)_t$ where R and $R^F$ are given above, t ranges from 3 up to about 3.5, a+b=2, and b ranges from 0.05 to 1, (ii) an effective amount of sodium fluorosilanolate catalyst described above, and (iii) an effective amount of chainstopper to control molecular weight, for a time sufficient to obtain a stable molecular weight; and (2) neutralizing the sodium fluorosilanolate with an effective amount of neutralizing agent.

The cyclosiloxane fluid is preferably a cyclotrisiloxane fluid where t=3. However, it is clear that impurities will exist in the fluid and thus average t will vary upward from 3. Economically, less pure cyclosiloxane fluids are less expensive and thus a substantial amount of polymer where t=4 and above may be present. Considering the above, average t may vary from about 3 to 3.5, $R^F$ content, i.e. b, empirically varies from 0.05 to 1. From a standpoint of having maximum properties derived from fluoroalkyl content, then b should be substantially 1. Values of b greater than 1 are sterically difficult to produce. Cost dictates that b is as low as possible. Preferably b is 0.5 to 1.0.

To obtain a cyclosiloxane fluid meeting the above empirical formula, a person skilled in the art might use a variety of different polymers in mixture. A mixture of 90 weight parts trimethyl-tris(3,3,3-trifluoropropyl)-trisiloxane with 10 weight parts trimethyltrivinyltrisiloxane would work well. A 100 weight parts homogenous fluid of trimethyl-tris(3,3,3-trifluoropropyl)-trisiloxane would be appropriate. A mixture of hexamethyltrisiloxane could be blended with pentamethyl-3,3,3-trifluoropropyltrisiloxane or trimethyl-tris(3,3,3-trifluoropropyl)trisiloxane could be blended with tetramethyl-tetra-(3,3,3-trifluoropropyl)tetrasiloxane as appropriate. Persons skilled in the art must adjust the cyclosiloxane fluid to arrive at the desired fluorosilicone polymer.

To the cyclosiloxane fluid is added an effective amount of the sodium fluorosilanolate catalyst herein. An effective amount is generally discussed in terms of sodium hydroxide equivalent weight. Thus, to the cyclosiloxane mixture should be added from 5 to 100 ppm of sodium fluorosilanolate calculated as equivalent NaOH. Preferably there should be from 10–30 ppm of sodium fluorosilanolate calculated based on equivalent NaOH. Amounts greater than 100 ppm will produce excessive salt residue in the fluorosilicone polymer which will lead to purification problems or the loss of certain properties, for instance, electrical properties.

It is known in the art of polymerizing fluorosilicone polymer to employ a catalyst promoter where desired. These promoters may also be employed herein. Low molecular weight polyethers or crown ethers are used to increase the efficiency of the catalyst. Suitable such promoters are low molecular weight polymers of, for example, ethylene oxide which have a molecular weight sufficient to form an ion dipole type complex but not so great that the melting point of the polymer exceeds the processing temperatures of polymerization. Generally molecular weight ranges from about 285 to 1100. These promoters are generally added to constitute 0.01 to 0.1 percent by weight of the cyclosiloxane and most preferably from about 0.02 to 0.03 percent by weight. Further teaching on promoters may be found in U.S. Pat. No. 4,122,247 concerning the low molecular weight polyethers, and in U.S. Pat. No. 4,157,337, concerning the crown ethers which are hereby incorporated by reference.

It is necessary in the polymerization of fluorosilicone polymer to employ a chainstopper to control molecular weight. The chainstoppers of the prior art generally fall into two categories.

The first category is a chainstopper in the traditional sense in that there is a non-reactive end-group added to terminate chain extension. These chainstoppers are, for example, methanol, octanol, 1,3-divinyl-1,1,3,3-tetramethyldisiloxane, hexamethyl disiloxane, vinyl terminated polysiloxanes as in U.S. Pat. No. 4,348,531 hereby incorporated by reference, trimethylchlorosilanes or dimethylvinyl aminosilanes. The non-reactive endgroup chainstoppers are added in the amount necessary to achieve the desired molecular weight. Calculating the desired amount of chainstopper to achieve any given weight is well understood. Persons skilled in the art will understand that the siloxane chainstoppers above and below function upon being split by a ring opened cyclosiloxane with the aid of the catalyst. The aminosilane and organic alcohol will simply react with an —OH group and form a chainstop. Thus, both the siloxane, the aminosilane and the organic alcohol can be added to the heated mixture from the beginning. In contrast, the chlorosilane is reactive with the catalyst and thus it can only be added when the desired molecular weight is obtained. The chlorosilane will play both the role of a chainstopper and a neutralizing agent. A general problem with this first category of chainstopper, particularly the siloxane chainstopper, is that they are not as reactive as the cyclosiloxane. In the presence of these chainstoppers molecular weight will build very quickly and long equilibration is required to stabilize the molecular weight at the desired level.

The second category of chainstopper is a reactive type of chainstopper which introduces —OH groups into the polymerization process. The —OH groups are slow to co-condense with a sodium based catalyst and at the concentration used as a chainstopper will not co-react or have an extremely low rate of co-reaction. The —OH groups can be introduced into the reaction as chainstopper either as a low molecular weight silanol fluid or as water. The active site of a polymerizing polymer chain will easily react with an —OH group of a silanol fluid to terminate the growing chain and begin a new one or it will react with water to produce a terminated polymer and NaOH. Of course, there will be condensation between terminating silanol groups but as stated above, this rate will not be significant under proper conditions. An advantage of these chainstoppers is that they react more readily and will prevent a very rapid build of molecular weight. Generally the silanol fluid has a viscosity of 100 to 200 centipoise at 25° C. and from about 100 to 2,000 ppm of such silanol is effective as a chainstopper. The use of reactive type chainstoppers in polymerizing fluorosilicone polymers is taught in U.S. Pat. No. 4,317,899, hereby incorporated by reference.

Suitable neutralizing agents are added following reaction and generally added in an effective amount upon cooling the reaction mixture to between 0° and 25° C. A number of conventional neutralizing agents may be used but preferably the neutralizing agent is phosphoric acid, an oganohalosilane or halosilane of the formula $R_c{}^1SiX_{4-d}$, wherein $R^1$ is alkyl, cycloalkyl, vinyl or phenyl, the alkyl and cycloalkyl having up to about 8 carbon atoms, X is bromine or chlorine, and b is 0 to 3. Preferred are phosphates, such as silyl phosphate as taught in U.S. Pat. Nos. 4,177,200 and U.S. Pat. No. 4,125,551 hereby incorporated by reference.

This process may be used to produce fluorosilicone polymer oils or gums having a viscosity between 1,000 and 200,000,000 centipoise at 25° C. These oils and gums may be compounded with reinforcing fillers such as fumed silica or precipitated silica; extending fillers, such as zinc oxide, iron oxide, titanium oxide, diatomaceous earth, and the like; heat aging additives, such as iron oxide; pigments, and other additives, such as flame retardant for instance, platinum by itself, or in combination with other materials and self-bonding additives, such as for instance, triallylisocyanurate. The gums can be mixed into a uniform mass to which is added a curing agent, e.g., a peroxide curing agent, such as benzoyl peroxide or dicumyl peroxide. The resulting composition can be cured at elevated temperatures, e.g., from 100° to 300° C., or they can be cured by radiation to produce a silicone elastomer.

DESCRIPTION OF THE PREFERRED EMBODIMENTS

The following examples are for the purpose of illustrating the present invention. They are not to be construed to limit the invention in any manner whatsoever.

Silanol Chainstopped Sodium Fluorosilanolate, NaFl-OH

Trimethyl-tris(3,3,3-trifluoropropyl)cyclotrisiloxane, 400 grams and silanol terminated methyl-3,3,3-trifluoropropylsiloxane fluid 6% —OH, 37 grams, were mixed thoroughly under nitrogen blanket while adding 22.4 grams of sodium fluorosilanolate seed catalyst 2.9% NaOH equivalent. The mixture is heated to 50° C. and when the addition of the seed catalyst is complete 40.4 grams of aqueous sodium hydroxide solution (50% NaOH) is added over a period of one hour. The nitrogen blanket is then converted to one of sparging, and the mixture heated to 120° C. With the appearance of a condensate in the receiver a vacuum of 100 MM of Mercury is slowly applied (tends to froth). The vacuum is maintained for 2–4 hours or until no perceptible condensate is coming over into the receiver. Heating is terminated and the mixture allowed to cool down to 50° C. prior to releasing the vacuum with nitrogen. A total of 428 grams (91% yield) of a slightly hazy fluid having a viscosity of 960 cps was obtained. The fluid is equivalent to a solution of NaOH having a strength of 4.3% by weight.

Vinyl Chainstopped Sodium Fluorosilanolate, NaFl-Vi

Trimethyl-tris(3,3,3-trifluoropropyl)cyclotrisiloxane, 2600 grams, silanol terminated methyl-3,3,3-trifluoropropylsiloxane fluid 6% —OH, 400 grams, and 1,3-divinyl-1,1,3,3-tetramethyldisiloxane, 147 grams are mixed thoroughly under nitrogen blanket while adding 98 grams of sodium fluorosilanolate seed catalyst, 4.3% NaOH equivalent. The mixture is heated to 50° C. and when the addition of the seed catalyst is complete, 260 grams of aqueous sodium hydroxide solution (50% NaOH) is added over a period of one hour. The nitrogen blanket is then converted to one of sparging, and the mixture heated to 120° C. With the appearance of a condensate in the receiver, a vacuum of 100MM of Mercury is slowly applied avoiding excessive frothing. The vacuum is maintained for 2-4 hours or until no perceptible condensate is coming over into the receiver. Heating is terminated and the mixture allowed to cool down to 50° C. prior to releasing the vacuum with nitrogen. A total of 3,176 grams (95% yield) of a clear colorless fluid having a viscosity of 1,664 cps was obtained. The NaOH strength was 4.3 wgt % and the silanol content was 0.03 wgt %; the density was 1.325 g/cc.

NaOH Slurry Catalyst

NaOH, 7 parts by weight and 25 micron particle size, is slurred in 93 parts by weight 1,1,3,3,5,5,7,7-octamethylcyclotetrasiloxane.

EXAMPLES 1-4

To separate samples containing 100 parts by weight trimethyltri(3,3,3-trifluoropropyl)cyclotrisiloxane heated to 135° C. with stirring was added the above catalysts as shown in Table 1. The amounts added are NaOH equivalents as determined by titration. Each sample is stirred with an impellor vertically inserted into the lower ⅓ of the composition. Upon addition polymerization proceeds and both the time to oiling and maximum temperature due to exothermic heating are measured. Time to oiling is the time required for the vortex leading into the impeller to disappear and for the surface to wet the impellor shaft up to the static level in the manner of an oil. The polymerization reaction was continued to yield high molecular wight fluorosilicone gum.

TABLE 1

| Catalyst | Equivalent NaOH,ppm | Time to Oiling, min. | Maximum Temperature, °C. |
|---|---|---|---|
| NaOH Slurry | 35 | 3.0 | 148 |
| NaFl—OH | 20 | 2.4 | 151 |
| NaFl—Vi | 20 | 2.0 | 149 |
| NaFl—Vi | 5 | 2.4 | 149 |

What is claimed is:

1. A method to produce fluorosilicone polymer comprising:
    (1) heating to a temperature of between 40° C. and 150° C. a mixture:
        (i) a cyclosiloxane fluid of the empirical formula $(R_aR_b^F SiO)_t$ where R is a substituted or unsubstituted $C_{1-8}$ hydrocarbon radical, $R^F$ is a $C_{1-8}$ fluorine substituted alkyl, t ranges from 3 to 3.5, $a+b=2$ and b ranges from 0.05 to 1.0;
        (ii) 5 to 100 as equivalent to NaOH of sodium fluorosilanolate liquid catalyst having the general formula:

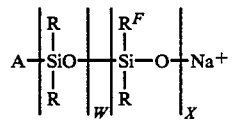

wherein W is 0 to 50; X is from 3 to 50; A is —OH, a $C_{1-8}$ alkenyl, $C_{1-8}$ alkyl, $C_{1-8}$ aryl, $C_{1-8}$ halosubstituted alkyl, $C_{1-8}$ alkoxy, or —O$^-$Na$^+$; R is a substituted or unsubstituted $C_{1-8}$ hydrocarbon radical; and $R^F$ is a $C_{1-8}$ fluorine substituted alkyl; and
        (iii) an effective amount of chainstopper to control molecular weight; and
    (2) neutralizing the sodium fluorosilanolate with an effective amount of neutralizing agent.
2. The method of claim 1 wherein said b ranges from 0.5 to 1.0.
3. The method of claim 1 wherein said b is substantially 1.
4. The method of claim 1 wherein $R^F$ is 3,3,3-trifluoropropyl.
5. The method of claim 1 wherein the amount of sodium fluorosilanolate is 10 to 30 ppm as equivalent NaOH relative to cyclosiloxane.
6. The method of claim 1 wherein said chainstopper is selected from methanol, octanol, 1,3-divinyl-,1,3,3-tetramethyldisiloxane, hexamethyl disiloxane, vinyl terminated polysiloxane, trimethylchlorosilane or dimethylvinyl aminosilane.
7. The method of claim 1 wherein said chainstopper is a silanol fluid or water.
8. The method of claim 1 wherein said neutralizing agent is a halosilane of the formula $R_c^1SiX_{4-d}$ where $R^1$ is alkyl, cycloalkyl, vinyl or phenyl, the alkyl or cycloakyl having up to 8 carbon atoms, X is bromine or chlorine, and b is 0 to 3.
9. The method of claim 1 wherein said —A is vinyl and said chainstopper is a vinyl functional chainstopper.

* * * * *